(12) United States Patent
Zimmerman et al.

(10) Patent No.: US 11,737,155 B2
(45) Date of Patent: Aug. 22, 2023

(54) COMMUNICATION WITH A DATA STORAGE DEVICE USING AN EMULATED WI-FI CAPTIVE PORTAL

(71) Applicant: Western Digital Technologies, Inc., San Jose, CA (US)

(72) Inventors: Israel Zimmerman, Ashdod (IL); Yaniv Makin, Nahariya (IL); Eyal Hakoun, Moshav Liman (IL)

(73) Assignee: Western Digital Technologies, Inc., San Jose, CA (US)

( * ) Notice: Subject to any disclaimer, the term of this patent is extended or adjusted under 35 U.S.C. 154(b) by 78 days.

(21) Appl. No.: 17/206,128

(22) Filed: Mar. 19, 2021

(65) Prior Publication Data
US 2022/0086928 A1    Mar. 17, 2022

Related U.S. Application Data

(60) Provisional application No. 63/078,335, filed on Sep. 15, 2020.

(51) Int. Cl.
*H04W 76/11*  (2018.01)
*H04W 12/06*  (2021.01)
*H04W 8/24*   (2009.01)
*H04W 4/80*   (2018.01)

(52) U.S. Cl.
CPC .............. *H04W 76/11* (2018.02); *H04W 4/80* (2018.02); *H04W 8/24* (2013.01); *H04W 12/06* (2013.01)

(58) Field of Classification Search
CPC ..................................................... H04B 5/0062
USPC .............. 455/67.14, 41.1, 406; 370/311, 338
See application file for complete search history.

(56) References Cited

U.S. PATENT DOCUMENTS

| | | | |
|---|---|---|---|
| 9,253,814 B1* | 2/2016 | Moncrief | H04W 76/25 |
| 2014/0229246 A1* | 8/2014 | Ghaffari | G06K 7/10237 |
| | | | 705/13 |
| 2017/0017817 A1* | 1/2017 | Chau | H04L 69/08 |
| 2018/0035365 A1* | 2/2018 | Koratekere Honnappa | |
| | | | H04W 48/16 |
| 2020/0387930 A1* | 12/2020 | Canceri | G10L 17/26 |

* cited by examiner

*Primary Examiner* — Kiet M Doan
(74) *Attorney, Agent, or Firm* — Patent Law Works, LLP

(57) ABSTRACT

A data storage device that, in a first mode, emulates a Wi-Fi adapter to facilitate communication with the host device. When the data storage device is connected to the host device, a processor of the data storage device emulates a Wi-Fi adapter to the connected host device. This includes emulating a Wi-Fi network. Responsive to a request to join the Wi-Fi network, a further notification is sent to trigger a captive portal displayed at the host device. The captive portal facilitates additional communication between the data storage device and the host device. The additional communication can be related to one or more of authentication, access control, firmware updates, and configuration of the data storage device. The data storage device also includes storage medium that, in a second mode, is accessible by the host device.

20 Claims, 10 Drawing Sheets

COMMUNICATION WITH A DATA STORAGE DEVICE USING AN EMULATED WI-FI CAPTIVE PORTAL

TECHNICAL FIELD

This disclosure relates to communication between a data storage device and a host device. In some examples, the disclosure relates to initialization, firmware update, authentication, access control, configuration of the data storage device.

BACKGROUND

Encryption of data enables relatively secure storage on data storage devices, such as block data storage devices connectable via a Universal Serial Bus (USB) cable. However, the user experience is often disappointing because the setup of passwords, keys and the like is cumbersome and complicated for technically unskilled users. If encryption is used, the keys and passwords are too often stored insecurely. As a result, many users leave existing encryption technology effectively unused resulting in exposed confidential data.

In some data storage devices, a physical keypad is provided at the data storage device to enter passwords, keys and the like. In other data storage devices, specialized software or drivers for the data storage device needs to be installed on the host device to allow entry of passwords, keys and the like before secure communication with the data storage device and the host device.

SUMMARY

The present disclosure seeks to facilitate communication between a data storage device and a host device. In some examples, this includes communication without specialized software or device drivers.

Disclosed herein is a data storage device comprising a communication interface, at least one processor, and a storage medium. The communication interface is configured to connect with a host device. The at least one processor is configured to: communicatively couple with the host device, via the communication interface, wherein in a first mode the at least one processor is configured to emulate a Wi-Fi adapter to the host device. In the first mode, the processor sends, via the communications interface, a notification of a new Wi-Fi network that is available to the host device, wherein the new Wi-Fi network is emulated by the at least one processor. Responsive to receiving a request from the host device to join the new Wi-Fi network, the processor sends, via the communications interface, a further notification to trigger a captive portal displayed at the host device, wherein the captive portal is configured to facilitate additional communication between the data storage device and the host device. In a second mode, the processor is configured to selectively enable access between the storage medium and the host device.

In some embodiments, the additional communication is associated with one or more of: authentication, access control, firmware updates, and configuration of the data storage device. In some examples, the captive portal facilitates such additional communication without requiring specialized software or device drivers to be installed on the host device.

In some embodiments of the data storage device, when in the first mode, the at least one processor is further configured to: receive, via the communications interface, authentication data entered into the captive portal displayed at the host device; verify that the received authentication data corresponds to a record in an authentication data set; and based on verification of the received authentication data, authorize additional functions of the data storage device.

In some further embodiments of the data storage device, to verify the received authentication data includes: sending, via the host device to a remote server, a representation of the received authentication data; and receiving, from the remote server, a confirmation or denial that the received authentication data corresponds to a record in the authentication data set.

In some other embodiments of the data storage device, the at least one processor is further configured to: determine, a frequency, or count, of received authentication data that failed verification with the record in the authentication data set. Based on determining the frequency, or count, of received authentication data satisfying one or more security thresholds, the data storage device is configured to perform one or more of the following: send, via the host device to a remote server, a warning indicative of the frequency, or count, of received authentication data that failed verification; delete, at least in part, contents of the storage medium; delete a key associated with the data storage device; and/or permanently disable at least part of the data storage device.

In some embodiments of the data storage device, the at least one processor is further configured to: receive, via the communications interface, an indication of an Internet Protocol (IP) address of the host device; verify, that the indication of the IP address of the host device corresponds to an authorized IP address; and based on verification of the IP address of the host device, enable the processor to operate in the first mode and/or the second mode.

In some embodiments of the data storage device the at least one processor in the second mode is configured to: determine a location of the data storage device; and based on the location satisfying specified access control parameters, selectively enable access between the storage medium and the host device.

In some further embodiments of the data storage device, the location and access control parameters are based on one or more of: IP address and/or range(s) of IP address; packet path(s); network(s) and remote server(s) connected to the host device (5); physical location; and latitude and longitude. This can include whether the host device is located in a particular network or network type, such as via a secure or unsecure network environment.

In some embodiments, the data storage device further comprises a near field communications (NFC) transceiver to read NFC code(s) from an NFC device. The at least one processor in the second mode is further configured to: receive, from the NFC transceiver, an NFC code; verify that the NFC code corresponds to one or more specified NFC codes; and responsive to verifying NFC code, selectively enable access between the storage medium and the host device.

In some further embodiments of the data storage device, the at least one processor is further configured to: receive, from the NFC transceiver, the NFC code or another NFC code, and responsive to receiving the NFC code or another NFC code, perform one or more steps in the first mode.

In some further embodiments of the data storage device, the at least one processor in the first mode is configured to: receive, from the NFC transceiver, an NFC code; verify that the NFC code corresponds to one or more specified NFC codes); and responsive to verifying the NFC code, authorize additional functions of the data storage device.

In some embodiments, the NFC device is one or more of: a credit card; an identification card; a fob; a unique NFC card programmed with a specific NFC code; a portable communication device; and a wearable electronic device.

In some embodiments, the data storage device further comprises: a Bluetooth transceiver to communicate with a Bluetooth device. The at least one processor in the second mode is configured to: receive, from the Bluetooth transceiver, an identifier from the Bluetooth device; verify that the identifier corresponds to one or more specified identifiers of Bluetooth devices; and responsive to verifying the identifier, selectively enable access between the storage medium and the host device.

In some embodiments of the data storage device, access between the storage medium and the host device includes selective access to a subset of the storage medium based on access control parameters.

In some embodiments of the data storage device, access between the storage medium and the host device is via the communication interface. In some particular examples, the communication interface is a universal serial bus (USB) interface.

Disclosed herein is a method for a data storage device to communicate with a host device, the method comprises communicatively coupling with a host device, wherein the data storage device emulates a Wi-Fi adapter to the host device. The method further comprises sending a notification of a new Wi-Fi network that is available to the host device, wherein the new Wi-Fi network is emulated by the data storage device. Responsive to receiving a request from the host device to join the new Wi-Fi network, the method comprises sending a further notification to trigger a captive portal displayed at the host device, wherein the captive portal facilitates additional communication between the data storage device and the host device. The method also comprises sending and receiving additional communication with the host device facilitated via the captive portal.

In some embodiments of the method, the additional communication is associated with one or more of: authentication, access control, firmware updates, and configuration of the data storage device.

In some embodiments, the method further comprises selectively enabling access between a storage medium of the data storage device and the host device.

Disclosed herein is a data storage device comprising: means for communicatively coupling with a host device, wherein the data storage device emulates a Wi-Fi adapter to the host device. The data storage device further comprises means for sending a notification of a new Wi-Fi network that is available to the host device, wherein the new Wi-Fi network is emulated by the data storage device. The data storage device further comprises means for sending a further notification to trigger a captive portal displayed at the host device in response to receiving a request from the host device to join the new Wi-Fi network, wherein the captive portal is configured to facilitate additional communication between the data storage device and the host device. The data storage device further comprises means for sending and receiving additional communication with the host device via the captive portal.

In some embodiments, the data storage device further comprises: means for storing data; and means for selectively enabling access between the means for storing data and the host device.

BRIEF DESCRIPTION OF DRAWINGS

An example will now be described with reference to the following drawings.

DESCRIPTION OF EMBODIMENTS

Overview

Figure 1:
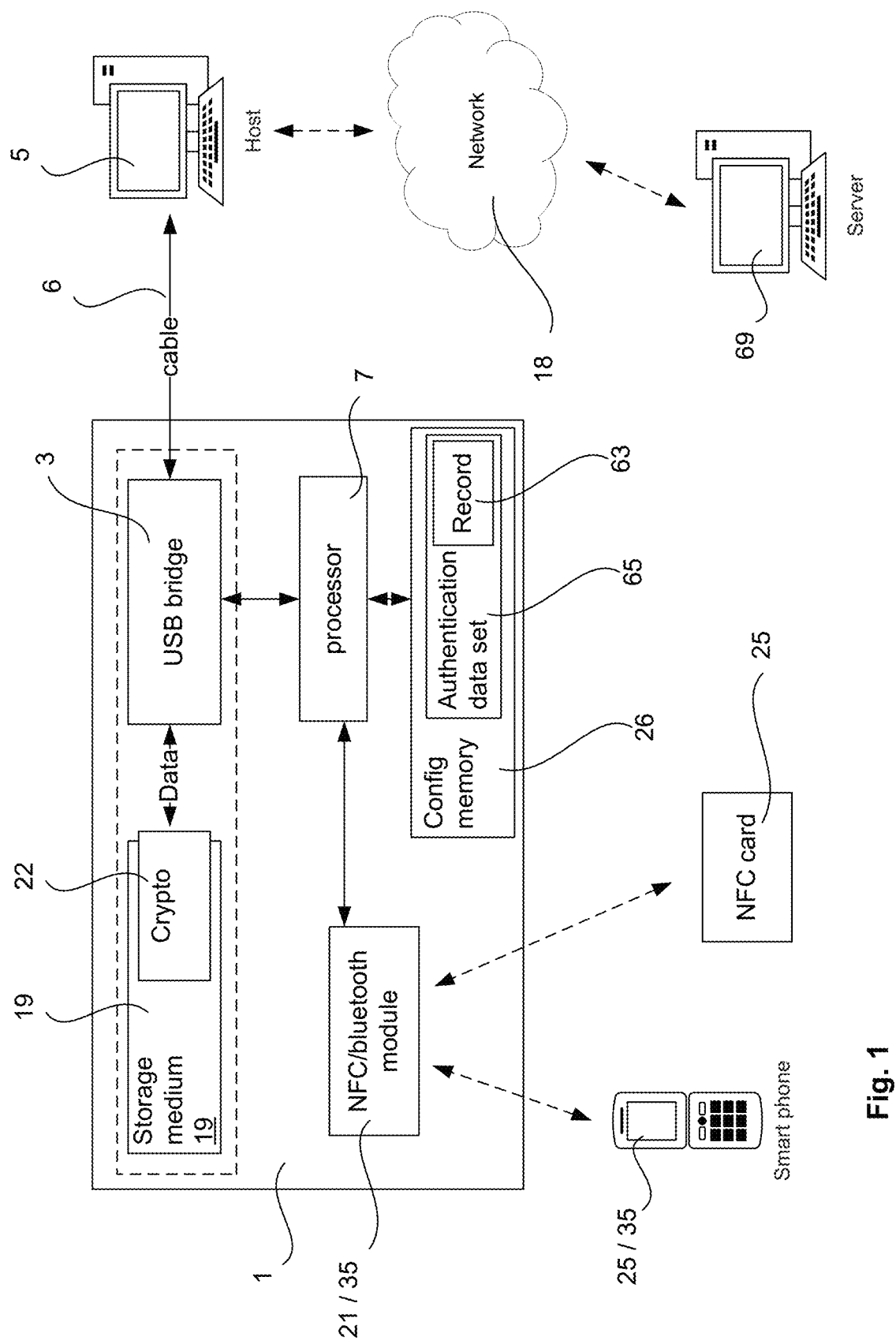
FIG. 1 is a schematic diagram of a data storage device in communication with a host device.
Figure 2:
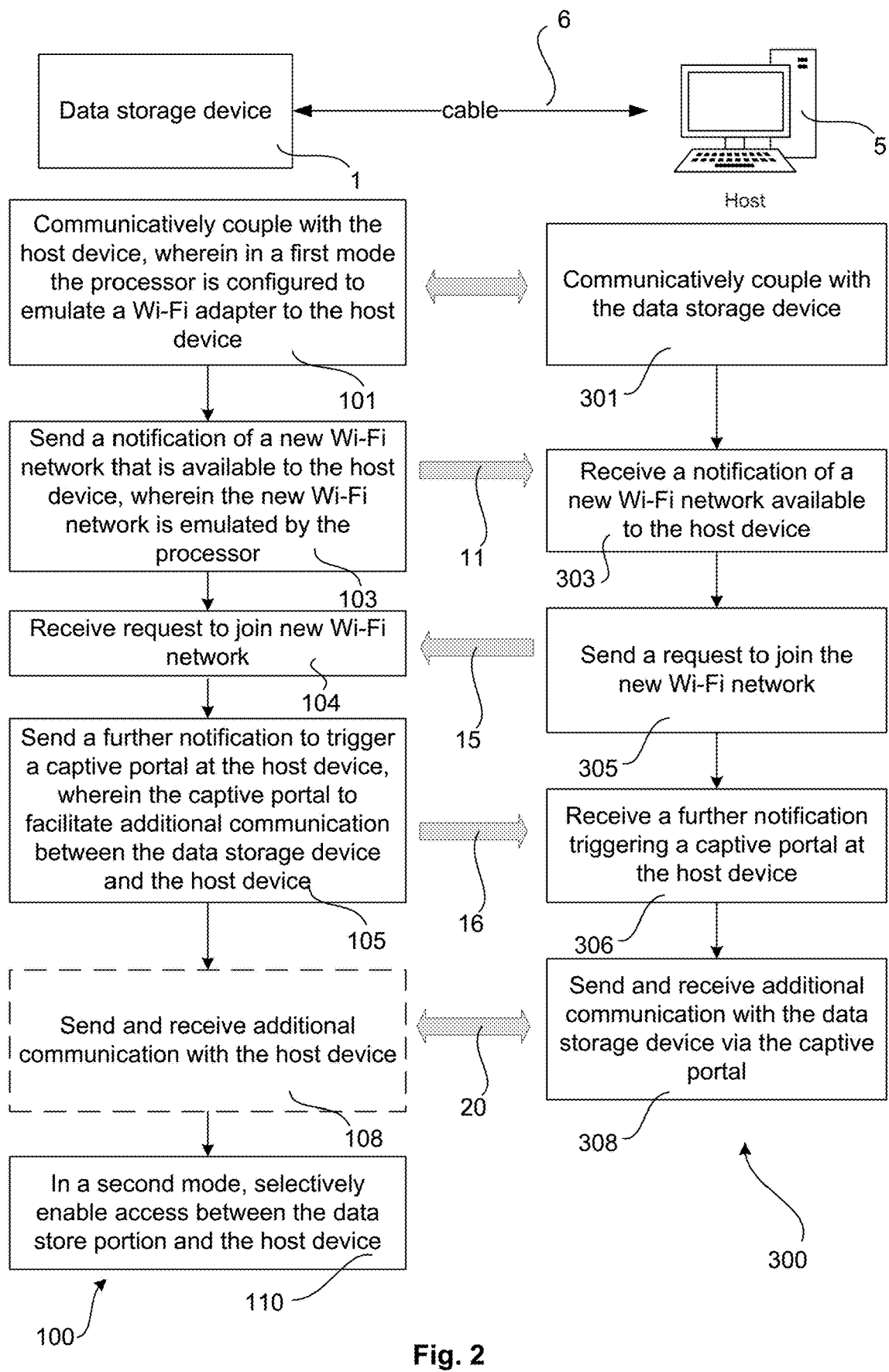
FIG. 2 is an example of a method of a data storage device emulating a captive portal.

FIG. 1 illustrates an example of a data storage device 1 including a communication interface 3, storage medium 19, and at least one processor 7. The communication interface 3 is configured to enable communication between the data storage device 1 and a host device 5. The communication interface may include a wire-based data port, which is provided in FIG. 1 by a USB (universal serial bus) bridge, for transmission of data between the host device 5 and the data storage device 1. The data storage device 1 is configured to facilitate examples of the methods 100, 300 illustrated in FIG. 2.

Figure 9:
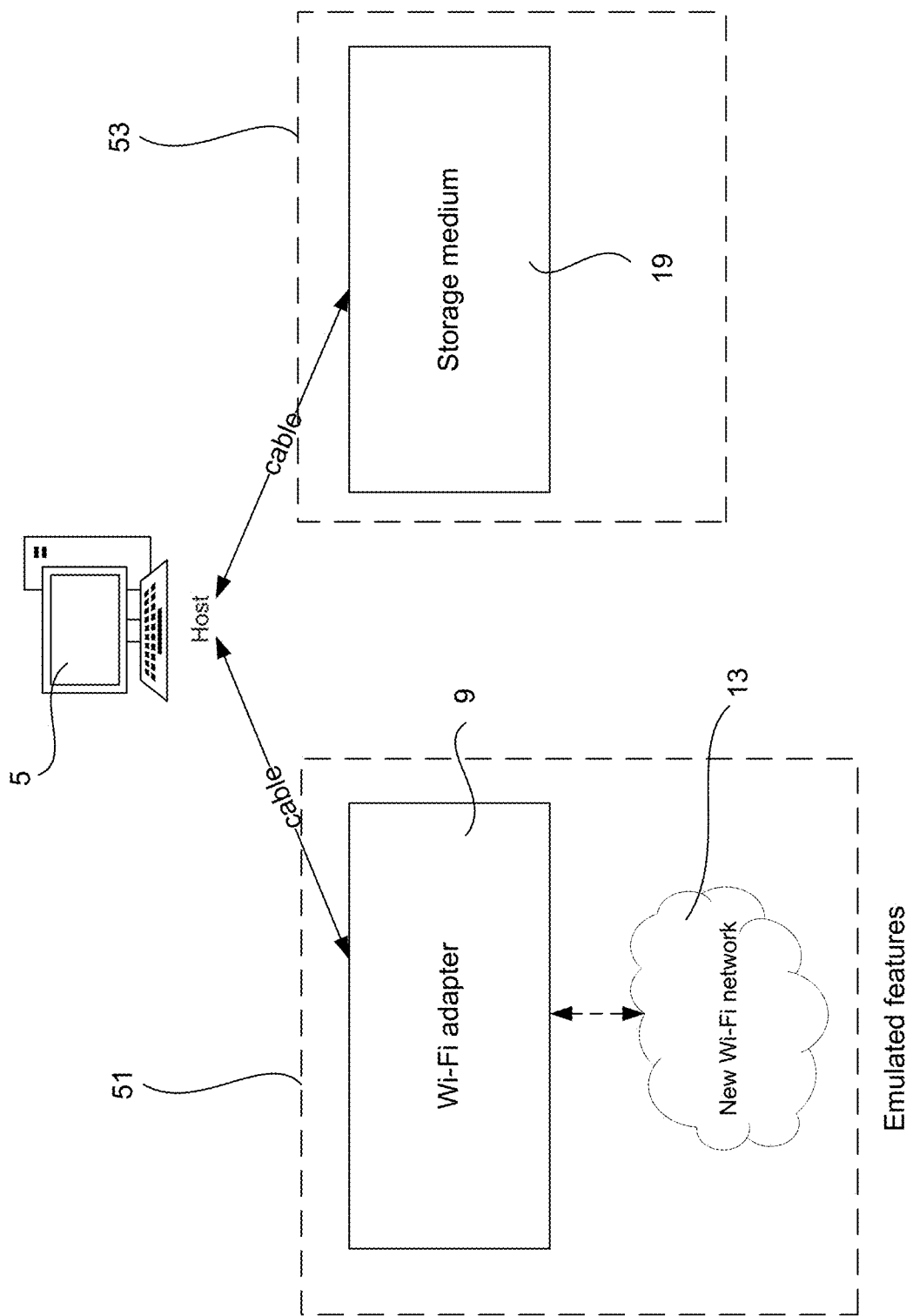
FIG. 9 is a representation of the host device connected to an emulated Wi-Fi adapter and the storage medium of the data storage device.

The at least one processor of the data storage device 1 is configured to communicatively couple with the host device 5 (for example, with a USB enumeration process 101, 301) via the communication interface 3. The at least one processor 7 is configured to operate in at least two modes as represented in FIG. 9. In a first mode 51, the at least one processor is configured to emulate a Wi-Fi adapter 9 to the host device 5. In a second mode 53, the at least one processor is configured to selectively enable access 110 between the storage medium 19 and the host device 5, as a data storage peripheral device.

Figure 4:
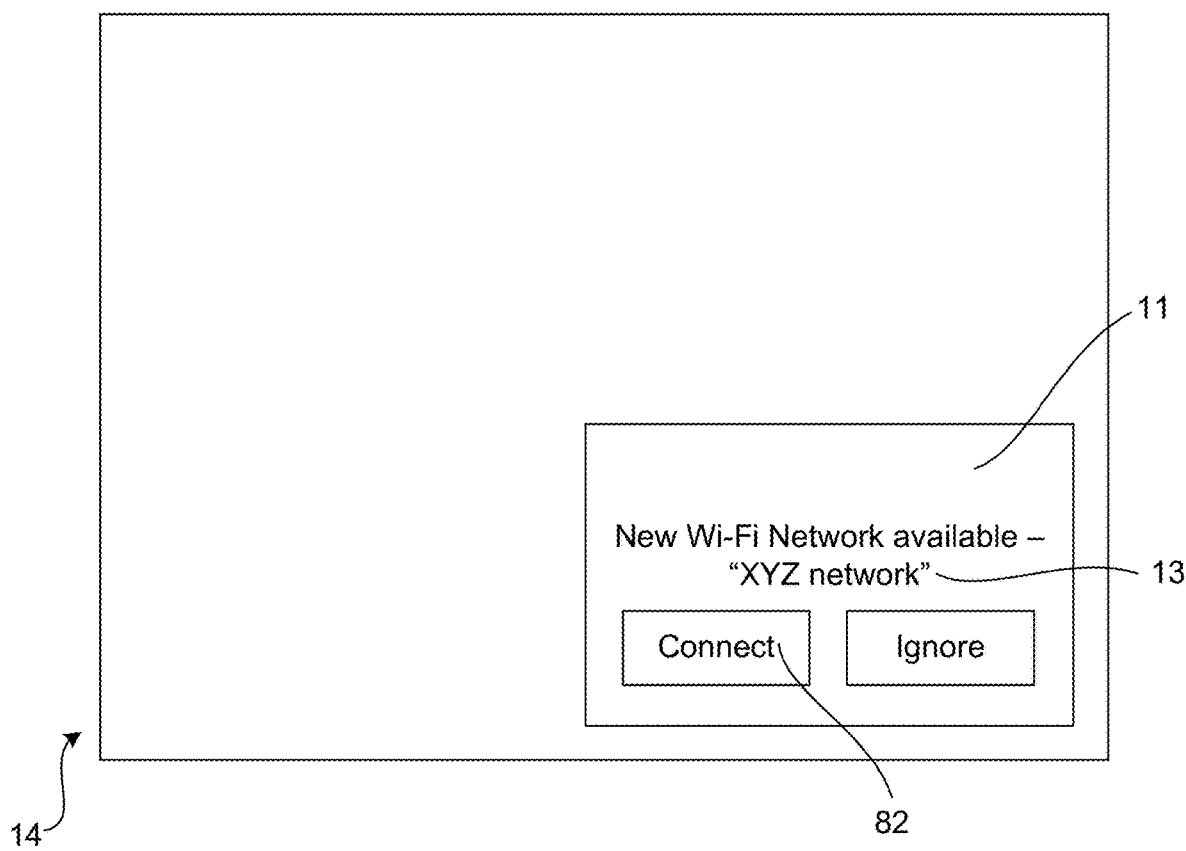
FIG. 4 is an example of the graphical user interface displaying an available emulated network.

In first mode, the at least one processor 7 emulating a Wi-Fi adapter sends 103, via the communication interface 3, a notification 11 of a new Wi-Fi network 13 that is available to the host device 5. The new Wi-Fi network 13 is emulated by the data storage device, and does not exist as a real Wi-Fi network, but appears from the perspective of the host device 5 as a Wi-Fi network as illustrated in FIG. 4. Responsive to receiving a request 15 from the host device 5 to join the new Wi-Fi network 13, the at least one processor 7 sends 105, via the communication interface 3, a further notification 16 to trigger a captive portal 17 displayed at the host device 5.

Figure 5:
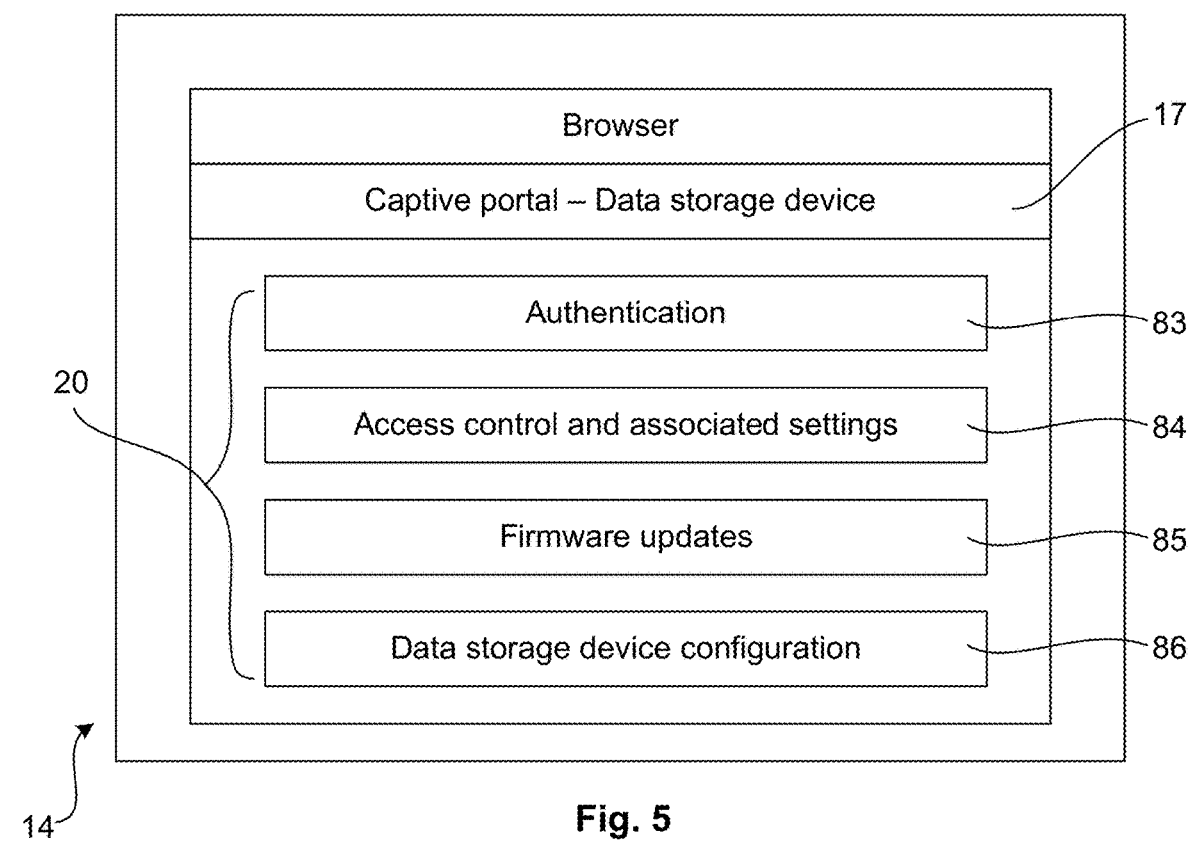
FIG. 5 is an example of the graphical user interface displaying a captive portal.
Figure 6:
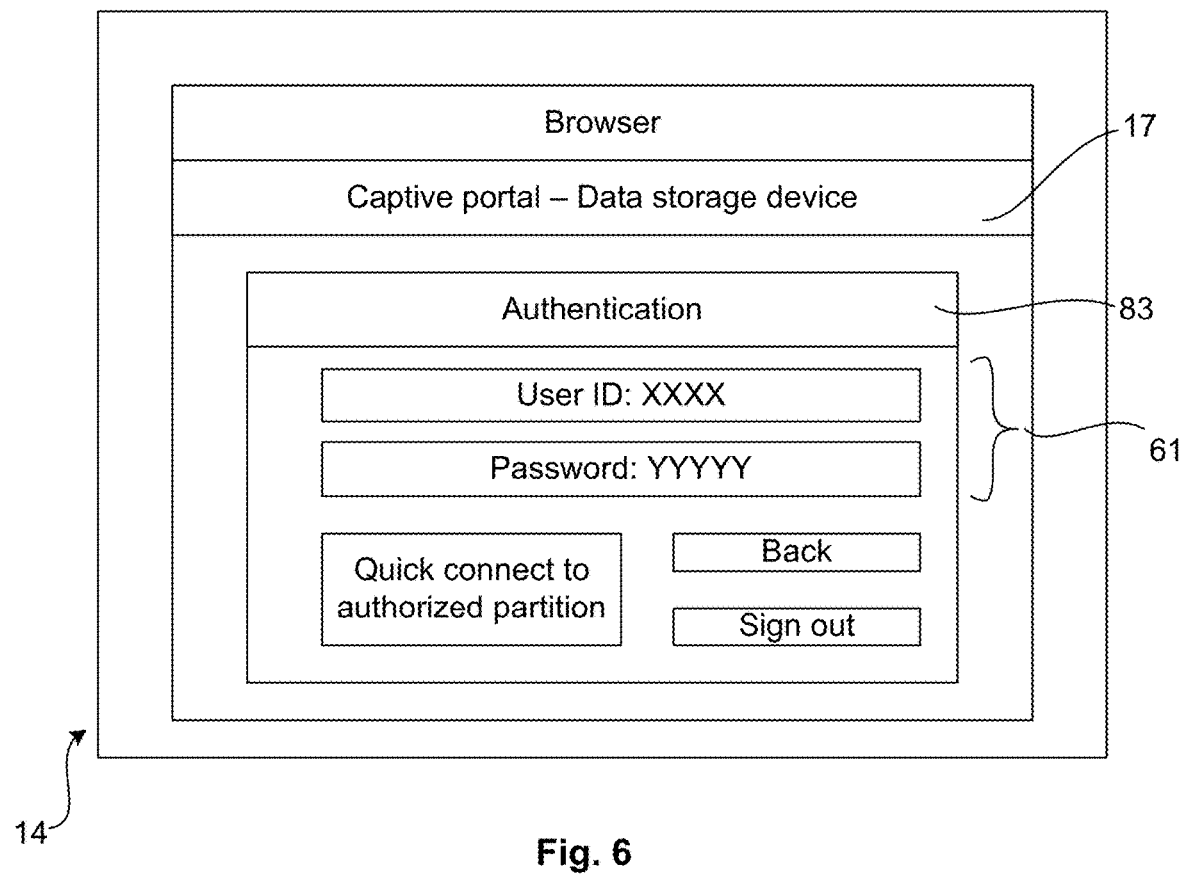
FIG. 6 is an example of the graphical user interface displaying a captive portal with prompts to enter authentication data.

The captive portal 17, displayed at the host device 5, is configured to facilitate sending and receiving 108, 308 additional communication 20 between the data storage device 1 and the host device 5. In some examples, the displayed captive portal 17 includes a window, or browser page, at a user interface of the host device 5 as illustrated in FIGS. 5 and 6. The captive portal 17 can then be used to enter or receive data forming additional communication 20. In some examples, additional communication 20 can be communication associated with one or more of: authentication, access control, firmware update, and configuration of the data storage device 1.

Figure 8:
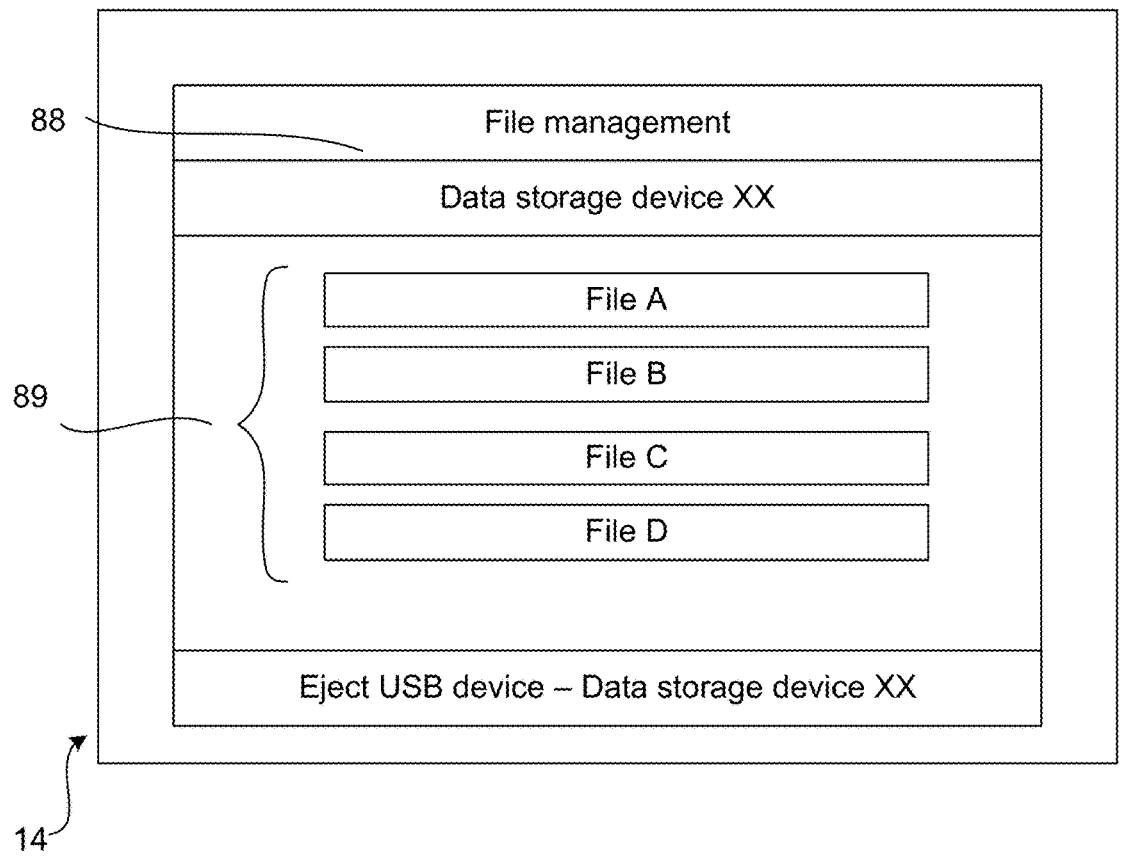
FIG. 8 is an example of the graphical user interface displaying files available for access on the storage medium.

In the second mode 53, the host device 5 is in data communication to read and/or write data the storage medium 19 in accordance with access control limitations, if any. An example of the second mode in operation, from the perspective of a user of the host device 1, is illustrated in FIG. 8 where a user can view and manage files in the storage medium 19 as a mass data storage device. In the second mode 53, the at least one processor 7 may operate to include access control functions of the data storage device 1.

Many operating systems are configured to enable captive portals without special device drivers or software, and so the emulation of a Wi-Fi adapter 9 and the captive portal 17 can facilitate ease of such additional communication 20. This is in contrast with other devices that may require device drivers or other software before advanced functions (such as device configuration, authentication, access control, or firmware updates) can be controlled or initiated via the host device 5. This can be particularly useful in environments where technical, communication, security, organizational policy, or other reasons prevent or impede a user of a host device 5 from installing device drivers or software on the host device 5.

The data storage device 1 may be used with host devices 5 that have an operating system that supports captive portal and standard PnP (plug-and-play) Wi-Fi adapters (in particular those that accept PnP of standard or generic devices without driver installation). Such host devices 5 can include desktop computers, laptop computers, tablet computers, cellular phones, televisions, set top boxes, etc.

The Data Storage Device 1

Features of an example of the data storage device 1 will now be described with reference to FIG. 1. It is to be appreciated that alternative examples may include more, or less, features.

Storage Medium 19

One function of the data storage device (in particular when the at least one processor 7 is in the second mode 53) is to register with the host device 5 as a mass data storage device providing the functionality to the operating system of the host device 5 of a block data storage device. Data storage device 1 includes a non-transitory storage medium 19 to store user content data. In some examples, this includes unencrypted user content data. In other examples, the storage medium 19 stores encrypted user content data. The user content data is the data that a user would typically want to store on a data storage device, such as files including image files, documents, video files, etc. The storage medium may be a solid state drive (SSD), hard disk drive (HDD) with a rotating magnetic disk or other non-volatile storage media. Further, the storage medium may be a block data storage device, which means that the user content data is written in blocks to the storage medium 19 and read in blocks from the storage medium 19.

Communication Interface 3

The communication interface 3 enables communication between the data storage device 1 and the host device 5. In this example, the one function is to provide a wire-based data port between the host device 5 and components of the data storage device 1. In a preferred example, this includes a USB (universal serial bus) bridge to enumerate with the host device 5.

In use, the data storage device 1 can appear, from the perspective of the host device 5, as two different downstream peripheral devices as illustrated in FIG. 9. That is, the communication interface 3 can function as a USB hub. One peripheral device is as a mass data storage device, whereby the host uses the storage medium 19 to store, read, and write, user content data. The other peripheral device is where the at least one processor 7 emulates a Wi-Fi adapter (9).

Processor 7 and Configuration Memory 26

The at least one processor 7 is associated with memory storing software to implement the method described herein. The at least one processor 7 operating in the first mode emulates a Wi-Fi adapter 9 to perform steps in method 100 including additional communication with the host device 5 through the captive portal 17.

In the first mode, the at least one processor 7 performs additional communication 20 that is associated with authentication, including authenticating as well as enrolling and configuration for future authentication. Additional communication can also include access control, firmware updates, and other configuration of the data storage device. These will be described in further detail below with reference to example methods.

In some examples, the at least one processor 7 in the second mode is also involved with access control, including selectively enabling access between the storage medium 19 and the host device 5. In one example, this can include enabling access by sending a cryptographic key to the cryptography engine 22 when authentication and/or authorization requirements are satisfied. This may be responsive to, in some examples, receiving valid authentication and/or authorization data from the host devices through the captive portal.

In other examples, the authentication and/or authorization data may be received from a remote server 69, via the host device 5. In other examples, the authentication and/or authorization data may be received from a Near Field Communication (NFC) transceiver 21 associated with the data storage device 1. In yet another example, the authentication and/or authorization data may be received from a Bluetooth transceiver 31 associated with the data storage device 1.

In one example, the at least one processor 7 may include a reduced instruction set computer (RISC). In one example, the at least one processor 7 is a Cortex M0 microcontroller from ARM Limited.

Configuration memory 26 stores data related to configuration of the data storage device 1. This may include data related to access control (including authentication, authorization, cryptographic keys), and other configuration parameters. This may include data related to generation of the Wi-Fi network, including the network name (where it is desirable to have a new network name for each session to prompt the captive portal). This may also include specified NFC codes 27 or specified identifiers 37 of Bluetooth devices discussed below.

Firmware associated with the at least one processor 7 may be stored in the configuration memory 26 or other non-volatile memory.

Near Field Communication Transceiver 21 and Bluetooth Transceiver 35

Some examples of the data storage device 1 include an NFC transceiver 21 and/or a Bluetooth transceiver 35.

The NFC transceiver 21 and Bluetooth receiver 35 can be used to receive authentication and/or authorization data to enable functions of the data storage device 1. In some examples, this includes enabling access between the host device 5 to at least part of the storage medium 19.

The NFC transceiver 21 may be configured to communicate with an NFC device 25, than can include one or more of:
 a credit card,
 an identification card,
 a fob,
 a unique NFC card programmed with a specific NFC code,
 a portable communication device, such as a cellular phone, tablet computer,
 a wearable electronic device.

The NFC transceiver 21 is configured to read NFC code(s) from the NFC device(s). The NFC code(s), or representations of the code(s), is then sent to, and received 211 by, the at least one processor 7 to verify 213 that the NFC code 23 corresponds to one or more specified NFC codes 27. Based on verifying the NFC code, the at least one processor 7 selectively enables further functions.

In some examples, this includes, in the second mode 53, selectively enabling 110, 215 access between the storage medium 19 and the host device 5. In other examples, the further functions may include functions associated with the first mode 51, including those associated with additional communication 20. For example, an NFC device 25 with a verifiable NFC code 23 associated with an administrator is required to be presented in proximity to the data storage device 1 before triggering the captive portal, firmware updates, configuration and other additional functions are selectively enabled.

The Bluetooth transceiver 31 may be used to selectively enable further functions in a similar manner to the NFC transceiver 21. The Bluetooth transceiver 31 is configured to receive 231 an identifier 33 from a Bluetooth device 35. The Bluetooth device may include, but not limited to, a portable communication device, such as a cellular phone, or a Bluetooth Low Energy (BLE) device. The at least one processor 7 verifies 233 that the identifier 33 corresponds to one or more specified identifiers 37 of Bluetooth devices. Based on the identifier 33 having been verified, the at least one processor 7 selectively enables further functions.

It is to be appreciated that other types of authentication means to receive authentication and/or authorization data can be used. For example, as an optical reader, may read identification text or numbers, barcodes, Quick Response codes, fingerprints, and/or documents. Information from these optical readers can be forwarded to the at least one processor 7 for authentication and/or authorization purposes.

Cryptography Engine 22

In one example, storage medium 19 comprises a cryptography engine 22 in the form of a dedicated and/or programmable integrated circuit that encrypts data to be stored on storage medium 19 and decrypts data to be read from storage medium 19. In such examples, the storage medium may provide a Small Computer System Interface (SCSI) or Advanced Technology Attachment (ATA) command set according to the Opal specification by the Trusted Computing Group (TCG).

The cryptography engine 22 is connected between the communication interface 3 and the storage medium 19 and is configured to use a cryptographic key to encrypt user content data to be stored on the storage medium 19 and to decrypt the encrypted user content data stored on the storage medium 19 in response to a request from the host device 5 and/or the at least one processor 7. In some examples, the cryptographic key and/or request to encrypt and decrypt user content data sent to the cryptography engine 22, via the communication interface 3, from the host device 5. In other examples, the at least one processor 7 functions as an access controller and provides, at least in part, the cryptographic key to the cryptography engine 22. For example the at least one processor 7 may provide the key to the communication interface 3 that then forwards to the cryptography engine 22. In other examples, the at least one processor forwards the cryptographic key directly to the cryptography engine 22.

The interface between the at least one processor 7, the communication interface may be an inter-integrated circuit bus which is useful in case this bust is implemented in existing chips. However, it is possible to use many other communication architectures including bus, point-to-point, serial, parallel, memory based and other architectures. The separation of functionality in dedicated chips as illustrated in FIG. 1 is only an example of one implementation. IT is possible to combine the functionalities or split the functionalities further. For example, the communication interface may be integrated with the at least one processor 7 into a single chip with a since core. In other cases, the communication interface 3 and the at least one processor 7 can be integrated with the cryptography engine 22 into a single dedicated chip with a single core. In other examples, the chips may have multiple cores.

Example of Methods 100, 300 of Emulating a Wi-Fi Adapter and Using the Captive Portal A detailed example of using the data storage device 1 and the host device 5, wherein a Wi-Fi adapter 9 is emulated to initiate a captive portal 17 will now be described in detail. The method will be described with reference to FIG. 2 that shows a computer-implemented method 100 performed by the data storage device 1 and a corresponding computer-implemented method 300 performed by the host device 5. Reference will also be made to FIGS. 3 to 8 that are representative of a graphical user interface 14 at the host device 5.

Figure 3:
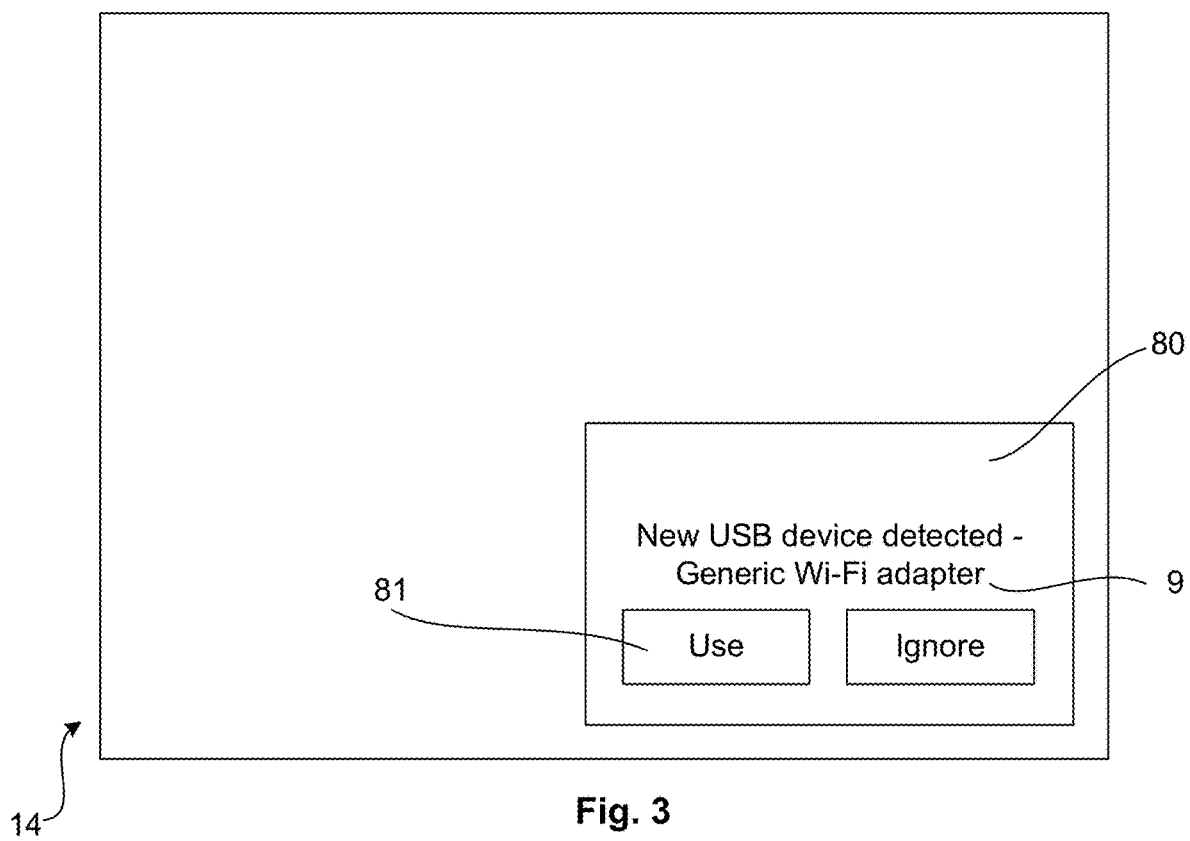
FIG. 3 is an example of a graphical user interface at a host device displaying a notification of an emulated Wi-Fi adapter.

The data storage device 1 is connected to the host device 5, such as using a wire-based cable 6. When this new connection is detected, the at least one processor 7, in a first mode 51, emulates a Wi-Fi adapter 9 to the host device 5. Preferably, the at least one processor 7 emulates a generic Wi-Fi adapter 9 that is supported by the operating system of the host device 5. That is, emulating a standard PnP Wi-Fi adapter. The advantage is that such an emulated device can communicate with the operating system without additional drivers, software or special settings. In one example, the emulated Wi-Fi adapter 9 is seen as a USB device by the host device 5. An example is illustrated in FIG. 9 where, the host device 5 has a connection with the emulated Wi-Fi adapter 9. At the user graphical user interface 14, as illustrated in FIG. 3, the user is notified 80 that a Wi-Fi adapter 9 is available for use by the host device 5. The user can then select to use 81 the Wi-Fi adapter 9 to proceed with the next step of communicatively coupling 101, 301 the at least one processor 7 (that is emulating the Wi-Fi adapter 9) with the host device 5.

It is to be appreciated that in some alternatives, and depending on the settings and operating system, that the host device 5 can automatically communicatively couple 301 with the at least one processor 7. That is, no other user selection is required for the host device 5 to use to the emulated Wi-Fi adapter 9.

The first processor 7 sends 103, via the communication interface 3, a notification 11 of a new Wi-Fi network 13 available for connection with the Wi-Fi adapter 9. The new Wi-Fi network 13, "XYZ network", is also emulated by the at least one processor 7 operating in the first mode 51 as illustrated in FIG. 9. Referring to FIG. 4, the notification 11 received 303 by the host device 5 may then be displayed at the graphical user interface 14, whereby the user can then select to connect 82 to the new Wi-Fi network 13. This selection 82 causes the host device 5 to send 305 a request to join the new Wi-Fi network 13 to the at least one processor 7. In some examples, every instance of the data storage device 1 emulating a Wi-Fi network results in generation of a new, and different, Wi-Fi network name to those used previously. This can advantageously prompt the host device 5 to display a new notification 11 on the graphical user interface 14 so that the user is prompted to select to join the new Wi-Fi network.

In alternative examples, and depending on the settings and operating system, the host device can automatically send 305 the request to join the new Wi-Fi network 13 without displaying the notification 11 at the graphical user interface nor receiving a specific selection to connect 82 by the user. That is, the host device 5 may automatically join any new Wi-Fi network 13 that is available via the emulated Wi-Fi adapter 9.

Turning back to FIG. 2, responsive to receiving 104 a request 15 from the host device 15 to join the new Wi-Fi network 13, the at least one processor 7 sends a further notification 16 to trigger a captive portal 17 displayed at the host device 5. The captive portal 17 facilitates additional communication 20 between the data storage device 1 and the host device 5. FIG. 5 illustrates an example of a captive portal 17 displayed at the graphical user interface 14.

In other applications, captive portals are typically web page(s) used with public Wi-Fi hotspots to enable authorized login or registration requests for future advertising lists. A typical scenario includes a device joining a new Wi-Fi network, whereby an automatic browser start up is initiated and directed to a web page associated with that new Wi-Fi network (or the operator of that Wi-Fi network). A practical example will include a person staying at a hotel connecting to a hotel Wi-Fi network. On selection of the hotel Wi-Fi network, a web browser on the person's device is directed to a captive portal of the hotel. The captive portal may require the person to enter their room details for login, or subscription, before enabling access to the interne or other network features. Many operating systems support Wi-Fi captive portal capability, in particular on new Wi-Fi hotspot connection.

Turning back to the present example, the captive portal capabilities in the operating system at the host device 5 enable additional communication 20, such as through interaction by the user through the captive portal 17, with the data storage device 1 without a special device driver or special software. In the example of FIG. 5, the user is given options to select of various additional communications 20 between the host device 5 and the data storage device 1, including: authentication 83, access control 84, firmware updates 85, and data storage device configuration 86. The captive portal 17 is stored by the data storage device (1), which in turn emulates a captive portal webpage on the emulated new Wi-Fi network 13.

Figure 7:
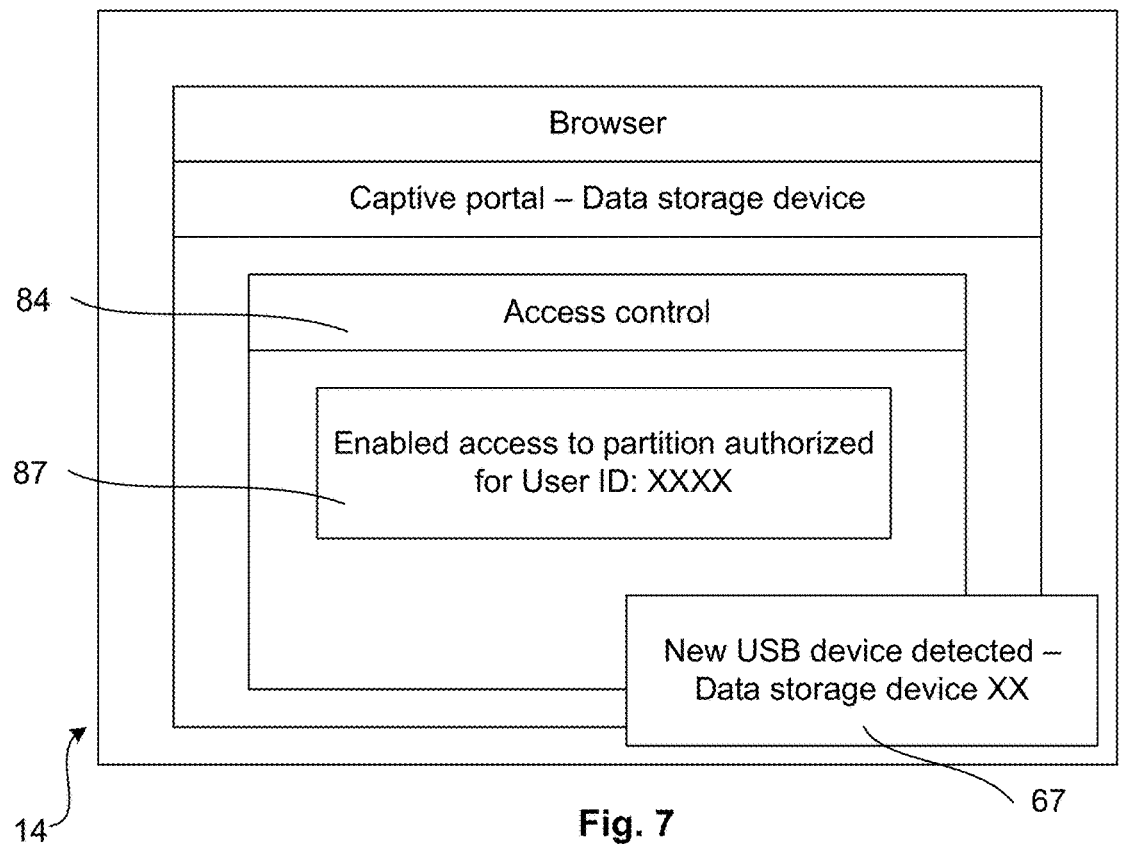
FIG. 7 is an example of the graphical user interface displaying a notification of access, by the host device, to a storage medium of the data storage device.

Example of Authentication with the Captive Portal and Selective Access to Storage Medium Authenticating through the captive portal 17 and subsequently accessing the storage medium 19, as an example of additional communication 20, will now be described with reference to screen shots in FIGS. 6 to 8, schematic diagram of FIG. 9, and the flow diagram in FIG. 10. In this example, authentication is local authentication in that the data storage device 1, and in particular the at least one processor 7, functionally performs the authentication.

In FIG. 6 the user inputs authentication data 61, such as the "User ID" and "Password", at the captive portal 17 in the browser generated at the graphical user interface 14. . In some examples, the authentication data 61 may be in other forms such as a fingerprint, NFC code 23, identifier from a Bluetooth device, MAC (media access control) address, etc. Facilitated by the captive portal, the authentication data 61 is then sent 309 from the host device 5, via the communication interface 3, to be received 107 by the at least one processor 7 as illustrated in FIG. 10.

The at least one processor 7 then verifies 109 that the received authentication data 61 corresponds to a record 63 in an authentication data set 65. The authentication data set 65 includes records of authentication data, associated with individuals or groups, which are authorized to interact with the data storage device 1 for additional functions 67.

In some examples, the authentication data set 65 is be stored local on the data storage device 1, such as in configuration memory 26. In other examples, at least part of the authentication data set 65 may be stored in the storage medium 19 in encrypted or unencrypted form. This allows authentication by the data storage device 1 without relying on a network or other external systems.

If the authentication data 61 is verified, the at least one processing device authorizes 111 additional function(s) 67 of the data storage device 1. In this example, the additional function(s) includes selectively enabling access 113 to at least part of the storage medium 19 (that is authorized for the corresponding authentication data), as illustrated in FIG. 7. This may include, from the perspective of the host device 5, connecting 311 with a data storage device via USB (i.e. communicating via the communication interface 3 and cable 6. In other alternatives, this may include passing a cryptographic key to the cryptography engine 22, to encode and decode data between the storage medium 19 and the host device 5.

FIG. 8 illustrates the graphical user interface 14 with the data storage device 1 enabling access 112 between the storage medium 19 and the host device 5. This may include allowing reading and writing files from the storage medium 19, as represented by the file management browser 88 listing files 89 available for access.

Other Additional Functions 67

It is to be appreciated that using the captive portal 17 to authorize the additional function 67 of accessing the storage medium 19 described above is a non-limiting example. In some examples, the additional function 67 of accessing the storage medium 19 may include selective access levels based on the authentication method or system used, or other access control parameters. For example, if it is determined that the host device is connected to an unsecure public environment or network, the data storage device 1 may only enable a specified subset of the storage medium 19 to be accessible. In contrast, if the host device 5 is connected to a secure network or other environment, the data storage device 1 may enable a larger, or different, portion of the storage medium 19 to be accessible. In some examples, this can include determining that connection and authentication with a remote server 69 is via a secure environment or an unsecure public environment. In some examples, the captive portal 17 identifies the identity, type or nature, of the network environment so that selective access levels are selectively enabled by the host device 5.

Other additional functions, other methods to verify authentication data and other access control methods will now be described below.

In some examples, the captive portal 17 is used as an interface for a user to initiate, or receive notifications of, firmware updates 85 for the data storage device 1. In some examples, the captive portal 17 may present a result of a comparison between the latest version of firmware available on a manufacturer's website versus the firmware version of the data storage device 1. The captive portal 17 may include a link to a website to download a firmware update package. In other examples, the captive portal 17 may include an option for a user to initiate the firmware update process directly from the captive portal 17.

Other additional functions can include settings and other configurations 86 associated with the data storage device 1. In one example, this may include creating partitions in the storage medium 19. In other examples, this includes specifying access control parameters to specify how the storage medium can be selectively accessed. This may include specifying authentication data 61 that has access to specific part(s) of the storage medium 19.

Additional functions can include enrolling user(s) and their authentication data 61 and storing related information into the authentication data set 65. Additional functions can also include configuring the NFC transceiver 21, Bluetooth transceiver 35, optical readers, fingerprint scanner, etc.

In some examples, the captive portal 17 can display, include a link, or otherwise enable navigation to, a further page to connect with the remote server 69. In some examples, the further page is hidden or has other access controls. At the further page, options are provided to enable access to the remote server 69 through another network interface at the host device 5.

In some examples, the captive portal 17 can also collect data about the host device 5, network(s) used by the host device 5, and other information on connected network devices. In some examples, this includes JavaScript running inside the HTML (hyptertext markup language) of the captive portal 17 page to collect such data, and then sending this data to the remote server 69 via the host device 5.

Other Methods to Verify Authentication Data

In alternative examples, verifying the authentication data 61 can be done, at least in part, external to the data storage device 1 such as at a remote server 69 as shown in FIG. 1. The received authentication data 61 is entered via the captive portal 17 and may include a "User ID" and "Password" combination, other identifier(s) of the user, MAC address of one or more of the Bluetooth device 45, host device, data storage device, NFC code 23, etc. To verify 109 the received authentication data 61, the method includes sending a representation of the received authentication data 61 to a remote server 69. This can include sending the representation of the received authentication data via the host device 5 to the remote server 69. This can include using an existing network 18 connected via a host network interface, such as a local area network, wide area network, or the interne that connects the host device 5 and the remote server 69.

The remote server 69, on receiving the representation of the received authentication data 61, then verifies 109 that the received authentication data 61. This can include comparing the received authentication data 61 corresponds to a record in an authentication data set associated stored in a data store associated with the remote server. The remote server 69 then sends a confirmation or denial that the authentication data 61 is authenticated to the at least one processor 7. Receiving a confirmation can then be used to selectively enable one or more of the additional functions 67.

Figure 11:
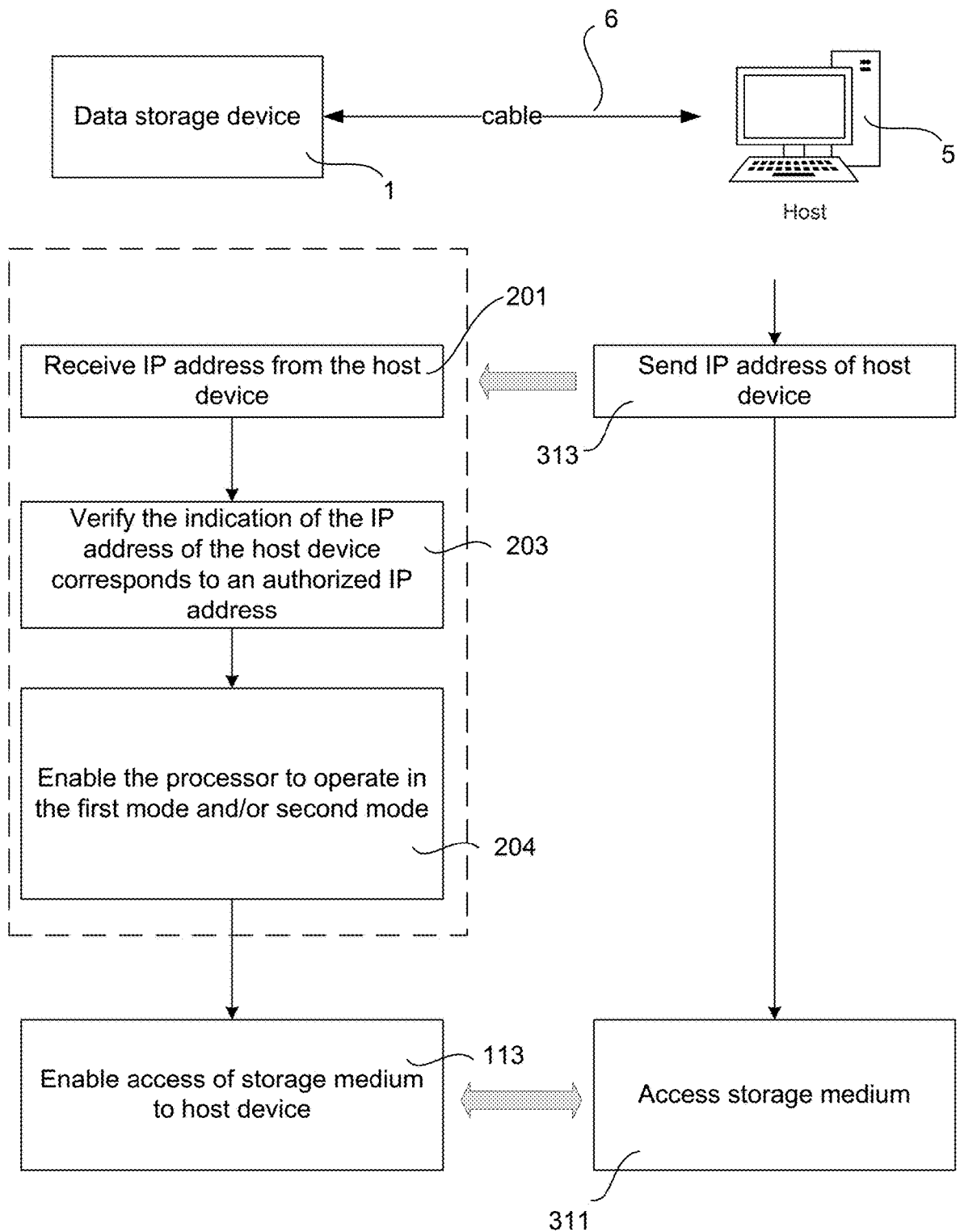
FIG. 11 is an example of a method of authentication with an IP address of the host device.

In some examples, and illustrated in FIG. 11, an Internet Protocol (IP) address associated with the host device 5 is used to selectively enable one or more functions of the data storage device 1. This can include the data storage device 1 receiving 201, via the communication interface, an indication of an IP address of the host device 5. The at least one processor 7 is configured to verify 203 if the IP address of the host device 5 corresponds to an authorized IP address. This can include reference to authorized IP addresses stored in an authentication data set 65 specified during enrolment. Based on successful verification of the IP address of the host device, the processor 7 is then configured to further enable 204 operation in the first mode, the second mode, or both the first and second mode (depending on the preferred configuration of the device).

For example, a data storage device 1 may be configured to allow use of the storage medium with trusted host devices with a specific IP address or range of IP addresses. In such examples, the authorized IP address(es) can be saved during initial enrolment that may include using the captive portal 17. Subsequently, the data storage device 1 enables the second mode 53 whenever the device 1 is connected by cable 6 to a host device 5 with an authorized IP address (and without specific authentication through the captive portal 17).

In yet another alternative, verifying the IP address of the host device 5 is performed, at least in part, at the remote server 69. This can include sending the indication of the IP address of the host device 5 to the remote server 69 and the remote server 69 sending, to the data storage device 1, a confirmation or denial that the IP address of the host device matches authorized IP address(es). In another example, the data storage device (1) may send a request to the remote server 69 for data indicative of the authorized IP address(es) such that the at least one processor can complete verification of the IP address of the host device 5 locally at the data storage device 1. Thus in some examples, authentication involves a ping or ping-like process with the remote server 69.

Figure 12:
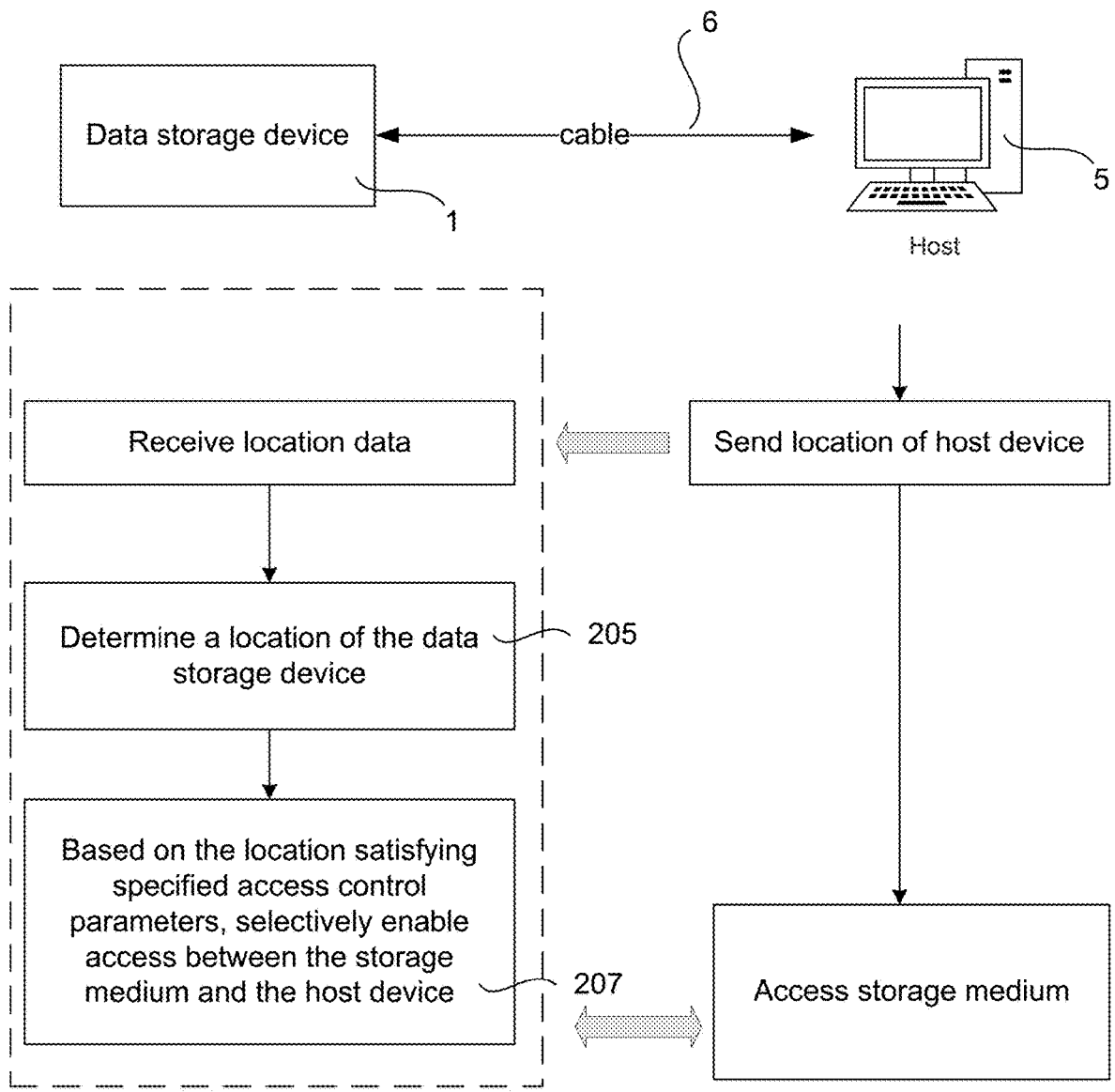
FIG. 12 is an example of a method of authentication based on location.

In yet another example, as illustrated in FIG. 12, verification of the location of the data storage device 1 and/or the host device 5 is used to selectively enable the processor 7 to operate in the first mode and/or the second mode. This may include the at least one processor determining 205 a location of the data storage device (or the host device). The location may be one or more of IP address or range of IP address(es) as noted above, an indicator of a physical location (such as an address, a room, building, campus, city, state, etc.), or latitude and longitude. In some examples, the location may be based on information received from the host device 5. In other examples, the data storage device 1 has sensors to determine location, such as a satellite navigation receiver or other receivers that receive location/navigation signals. Based on the location satisfying specified access control parameters (that may be part of the authentication data set), the processor 7 selectively enabling the processor to operate in the first mode and/or second mode. In a particular example, this includes operating in the second mode to selectively enable access (207) between the storage medium 19 and the host device 5.

In some examples, determining the location of the data storage device 1 includes a traceroute function (Ethernet route trace). This involves determining the possible routes (paths) that packets of information can take between the host device 5 and the remote server 69.

In some examples, the data storage device 1 monitors failed authentication or access attempts. This can include determining a frequency, or count, of received authentication data 61 that failed to verify with the record in the authentication data set. Based on the frequency, or count, satisfying one or more security thresholds the data storage device is configured to take one or more security actions discussed below. In one example the security threshold may include, as an example, three (or another number) of failed consecutive failed attempts. In other examples, the security threshold may be based on a number of cumulative failed attempts.

The security actions may include sending, to the remote server 69, a warning indicative of the frequency, or count, of received authentication data that failed to verify. This warning may be used to alert a security user, or a security system, to take further action. This may include remotely erasing data in the storage medium 19, or otherwise neutralizing, one or more functions of the data storage device 1. The security user, or security system, may use the warning to contact administrators or the authorized users of the data storage device 1.

Another security action may include the data storage device 1 deleting, at least in part, contents of the storage medium 19. In another example, the security action includes deleting one or more key(s) associated with the data storage device 1.

In yet another example, the security action includes permanently disable at least part of the data storage device 1. This may include physically shorting or otherwise destroying key components of the data storage device 1.

Access Control

Examples of access control have been described above as part of, or as a result of, verifying authentication data. Other access control variations will now be described.

Access control to the storage medium 19 may include a subset of the storage medium. For example, access control parameters can be associated to particular authentication data. This can be useful in situations where one data storage device 1 may be used by different users or by the same users but for different purposes or projects. Thus, a first authentication data can be associated with, and enable access to, a first subset of the storage medium 19. Similarly, a second authentication data can enable access to a second subset of the storage medium 19. In other examples, the access control parameters includes the identity, type, or nature of network(s) that are connected to the host device (5). For example, an access control parameter may include distinctions between secure and unsecure network environments, and whereby selective access to respective subsets of the storage medium 19 is based on determining if the host device 5 is located in those respective network environments.

Figure 10:
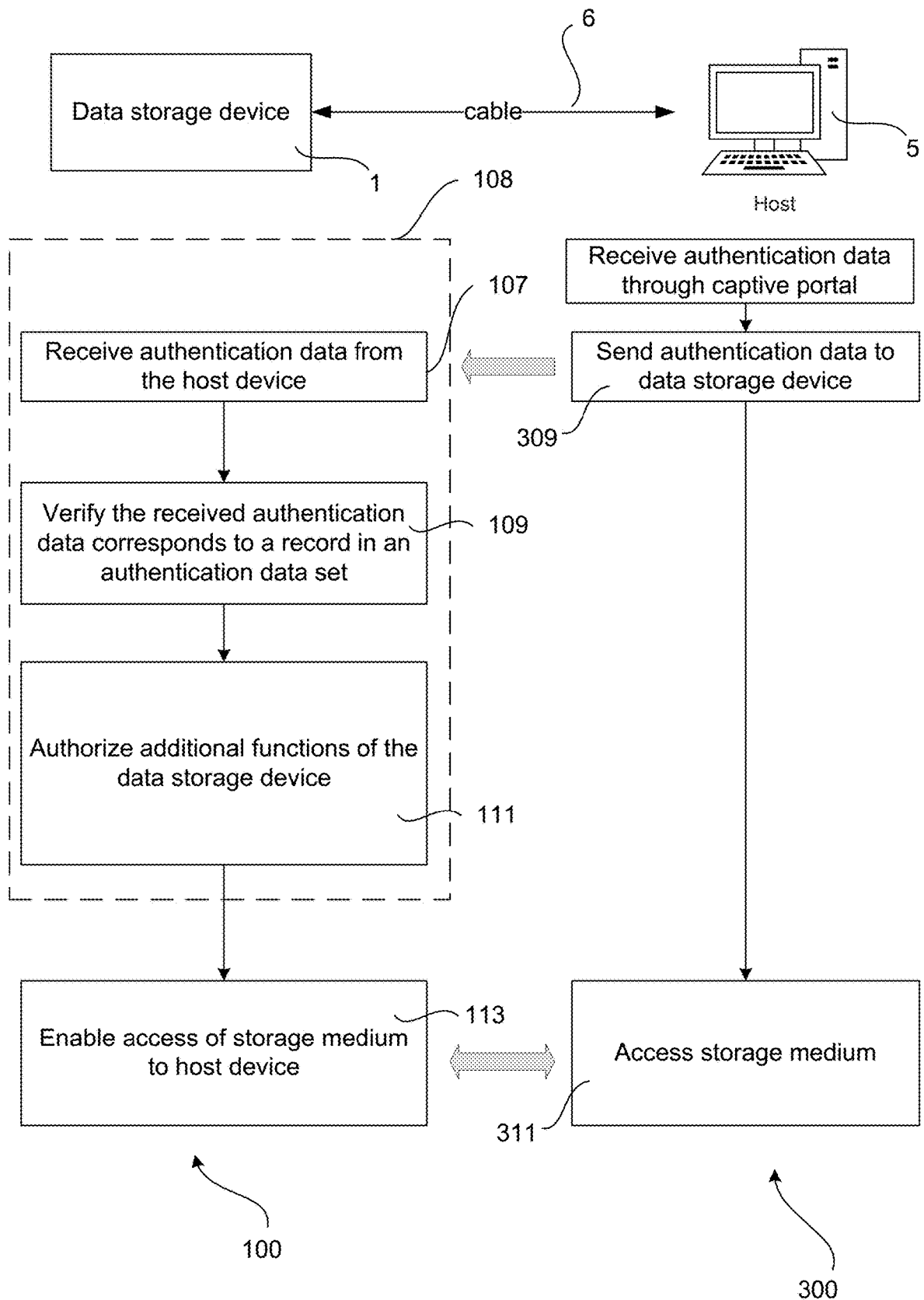
FIG. 10 is an example of a method of authentication with the captive portal.

In the example illustrated in FIG. 10, access control involved using the captive portal to enter authentication data. Other alternatives also involved using the captive portal to communicate with the remote server 69 or information from the host device 5 to authenticate for access control. However, in some examples, the captive portal 17 is used primarily for administrative function such as configuration, on boarding new users, and software updates. The day-to-day access control for using the storage medium may be initiated without the captive portal 17, such as via the NFC transceiver 21, Bluetooth transceiver 31, etc. In some examples, the day-to-day access control is automated without the captive portal and may include verifying the IP address of the host device 5, location of the host device 5, either locally or at the remote server. In some examples, access control may require authentication means and methods similar, or the same, as authentication described elsewhere in this specification.

Figure 13:
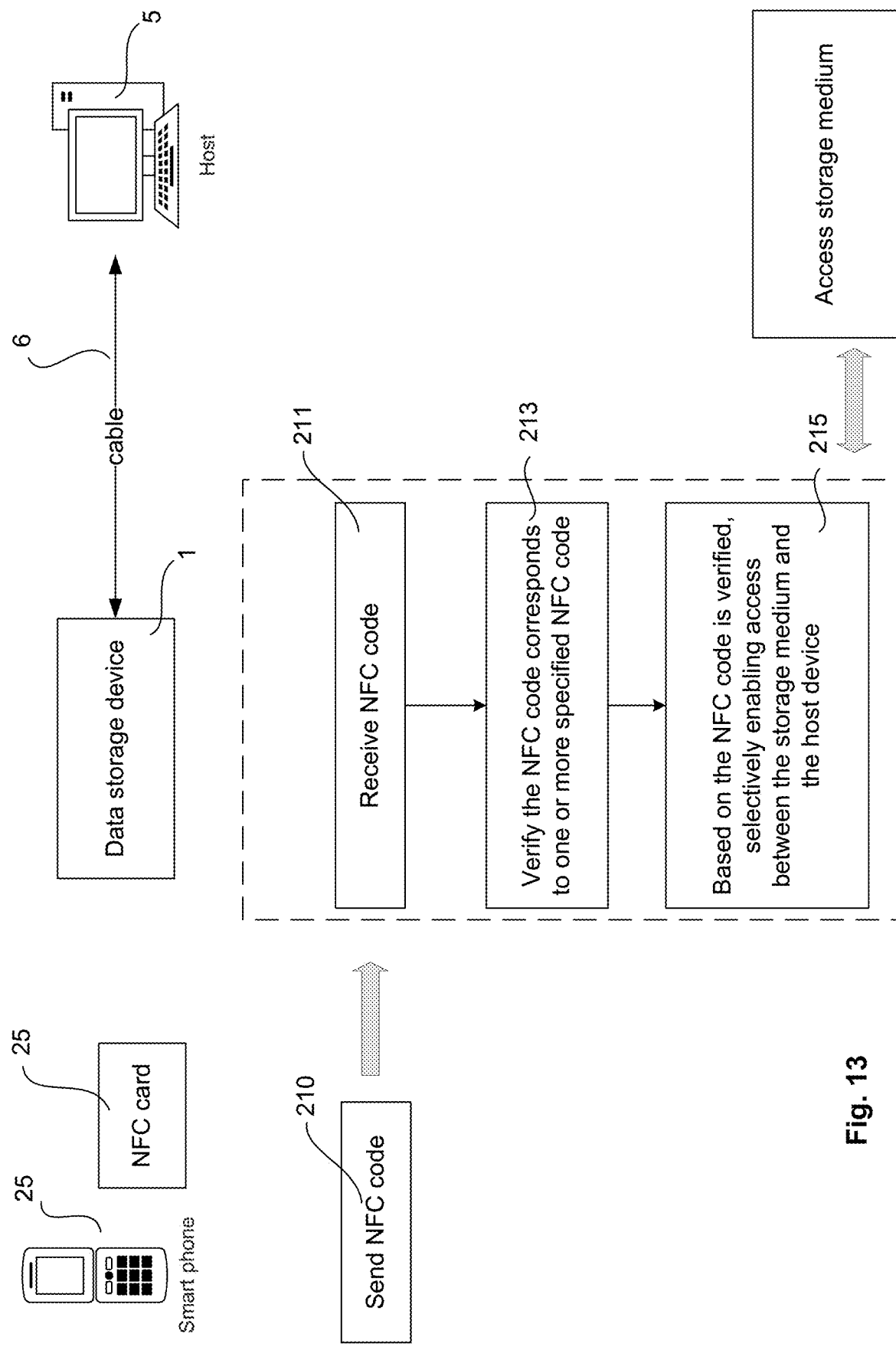
FIG. 13 is an example of a method of authentication using near field communication.

Another example of access control, in the second mode, with the NFC transceiver 21 will now be described in detail with reference to FIG. 13.

The data storage device 1 is connected to the host device 5 so that the NFC transceiver 21 is powered and configured communicate with other NFC devices. An NFC card, smart phone, or other NFC device 25 is then positioned in the vicinity of the data storage device 1 for communication. This enables the NFC device 25 to send 210 an NFC code 23 that is received 211 by the NFC transceiver 21 and processor 7. The processor 7 then determines if the received NFC code corresponds to one or more specified NFC codes 27 that have been associated with an authorized NFC device 25. If so, the received NFC code is verified 213 as corresponding to a specified NFC code 27, and the processor enables access 215 between the storage medium 19 and the host device 5.

The above examples, with reference NFC technology, can also be adapted to use Bluetooth technology. This can include the Bluetooth transceiver 31 receiving an identifier 33 from a Bluetooth device 35 in proximity to the data storage device 1. The processor 7 is configured to receive the identifier 33 and verify that the identifier 33 corresponds to one or more specified identifiers 37. If verified, the processor selectively enables access between the storage medium 19 and the host device 5.

It is to be appreciated that a particular NFC code 27 or identifier 33 may be associated with one or more part(s) of the storage medium 19, but not to other parts of the storage medium. This can be useful for associating an NFC code or identifier to an authorized user to allow that use selective access to those parts they are authorized to use whilst excluding access to parts they are not authorized to use.

Variations

In the above examples, the communication interface 3 comprises a wire-based port. However, in some variations, the communication interface 3 may include a wireless data port (not shown) for wireless transmission of data between the host device 5 and the data storage device 1. For example, the communication interface 3 may communicate with the host device 5 where the data storage device 1 is connected as a wireless peripheral device to the host device 5.

In some of the above-mentioned examples, access control to the storage medium requires authentication and/or verification. However, in some alternative examples, access control does not require authentication or verification and the storage medium 19 is always available to the host device 5 (if physically connected). The data storage device 1 and the at least one processor 7 is operable, in the first mode 51, if the user optionally wishes to perform additional communication 20 through the captive portal. Advantageously, this can allow configuration or other administration functions at the data storage device without specialized driver or software on the host device.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A data storage device comprising:
a storage medium configured to store host data from a host device;
a communication interface configured to communicate with the host device over a wire-based connection; and
at least one processor configured to:
communicatively couple with the host device, via the communication interface;
in a first mode:
emulate a Wi-Fi adapter to the host device via the wire-based connection, wherein the emulated Wi-Fi adapter is supported by an operating system of the host device for receiving wireless communication from a wireless network;
send, via the communications interface, a notification of a new Wi-Fi network that is available to the host device, wherein the new Wi-Fi network is emulated by the at least one processor without a corresponding wireless network; and
responsive to receiving a request from the host device to join the new Wi-Fi network, send, via the communications interface, a further notification to trigger a captive portal displayed at the host device, wherein the captive portal is configured to facilitate additional communication between the data storage device and the host device; and
in a second mode, selectively enable access between the storage medium and the host device.

2. The data storage device according to claim 1, wherein the additional communication is associated with one or more of: authentication, access control, firmware updates, and configuration of the data storage device.

3. The data storage device according to claim 1, wherein, in the first mode, the at least one processor is further configured to:
receive, via the communications interface, authentication data entered into the captive portal displayed at the host device;
verify that the received authentication data corresponds to a record in an authentication data set; and
based on verification of the received authentication data, authorize additional functions of the data storage device.

4. The data storage device according to claim 3, wherein to verify the received authentication data includes:
sending, via the host device to a remote server, a representation of the received authentication data; and
receiving, from the remote server, a confirmation that the received authentication data corresponds to the record in the authentication data set.

5. The data storage device according to claim 3, wherein the at least one processor is further configured to:
determine a frequency, or count, of received authentication data that failed verification with the record in the authentication data set;
based on determining the frequency, or count, of received authentication data satisfying one or more security thresholds, the data storage device is configured to:
send, via the host device to a remote server, a warning indicative of the frequency, or count, of received authentication data that failed verification;
delete, at least in part, contents of the storage medium;
delete a key associated with the data storage device; and/or
permanently disable at least part of the data storage device.

6. The data storage device according to claim 1, wherein the at least one processor is further configured to:
receive, via the communications interface, an indication of an Internet Protocol (IP) address of the host device;
verify that the indication of the IP address of the host device corresponds to an authorized IP address; and
based on verification of the IP address of the host device, enable the processor to operate in the first mode and/or the second mode.

7. The data storage device according to claim 1, wherein the at least one processor in the second mode is further configured to:
determine a location of the data storage device; and
based on the location satisfying specified access control parameters, selectively enable access between the storage medium and the host device.

8. The data storage device according to claim 7, wherein the location and the specified access control parameters are based on one or more of:
IP address and/or range(s) of IP address;
packet path(s);
network(s) and remote server(s) connected to the host device;
physical location; and
latitude and longitude.

9. The data storage device according to claim 1, further comprising:
a near field communications (NFC) transceiver configured to read NFC code(s) from an NFC device, wherein the at least one processor in the second mode is configured to:
receive, from the NFC transceiver, an NFC code;
verify that the NFC code corresponds to one or more specified NFC codes; and
responsive to verifying the NFC code, selectively enable access between the storage medium and the host device.

10. The data storage device according to claim 9, wherein the at least one processor is further configured to:
receive, from the NFC transceiver, the NFC code or another NFC code, and
responsive to receiving the NFC code or another NFC code, perform one or more steps in the first mode.

11. The data storage device according to claim 9, wherein the at least one processor in the first mode is further configured to:
receive, from the NFC transceiver, an NFC code;
verify that the NFC code corresponds to one or more specified NFC codes; and
responsive to verifying the NFC code, authorize additional functions of the data storage device.

12. The data storage device according to claim 9, wherein the NFC device is one or more of:
a credit card;
an identification card;
a fob;
a unique NFC card programmed with a specific NFC code;
a portable communication device; and
a wearable electronic device.

13. The data storage device according to claim 1, further comprising:

a Bluetooth transceiver configured to communicate with a Bluetooth device, wherein the at least one processor in the second mode is further configured to:
- receive, from the Bluetooth transceiver, an identifier from the Bluetooth device;
- verify that the identifier corresponds to one or more specified identifiers of Bluetooth devices; and
- responsive to verifying the identifier, selectively enable access between the storage medium and the host device.

14. The data storage device according to claim 1, wherein access between the storage medium and the host device includes selective access to a subset of the storage medium based on access control parameters.

15. The data storage device according to claim 1, wherein:
access between the storage medium and the host device is via the communication interface; and
the at least one processor is further configured to:
- register with the host device as a W-Fi adapter to support the first mode; and
- register with the host device as a mass data storage device to support the second mode.

16. A method comprising:
- communicatively coupling a data storage device with a host device over a wire-based connection;
- emulating, by the data storage device and over the wire-based connection, a Wi-Fi adapter to the host device, wherein the emulated Wi-Fi adapter is supported by an operating system of the host device for receiving wireless communication from a wireless network;
- sending a notification of a new Wi-Fi network that is available to the host device, wherein the new Wi-Fi network is emulated by the data storage device without a corresponding wireless network;
- responsive to receiving a request from the host device to join the new Wi-Fi network, sending a further notification to trigger a captive portal displayed at the host device, wherein the captive portal facilitates additional communication between the data storage device and the host device;
- sending and receiving additional communication with the host device via the captive portal; and
- selectively enabling access between a storage medium of the data storage device and the host device.

17. The method of claim 16, wherein the additional communication is associated with one or more of: authentication, access control, firmware updates, and configuration of the data storage device.

18. The method of claim 16, wherein selectively enabling access between the storage medium of the data storage device and the host device is responsive to the additional communication.

19. A data storage device comprising:
- a processor;
- a memory;
- a storage medium configured to store host data from a host device;
- means, stored in the memory for execution by the processor, for communicatively coupling with the host device over a wire-based connection;
- means, stored in the memory for execution by the processor, for emulating a Wi-Fi adapter to the host device, wherein the emulated Wi-Fi adapter is supported by an operating system of the host device for receiving wireless communication from a wireless network;
- means, stored in the memory for execution by the processor, for sending a notification of a new Wi-Fi network that is available to the host device, wherein the new Wi-Fi network is emulated by the data storage device without a corresponding wireless network;
- means, stored in the memory for execution by the processor, for sending a further notification to trigger a captive portal displayed at the host device in response to receiving a request from the host to join the new Wi-Fi network, wherein the captive portal is configured to facilitate additional communication between the data storage device and the host device;
- means, stored in the memory for execution by the processor, for sending and receiving additional communication with the host device via the captive portal; and
- means, stored in the memory for execution by the processor, for selectively enabling access between the storage medium and the host device.

20. The data storage device of claim 19, wherein the means for selectively enabling access between the storage medium and the host device is responsive to the additional communication.

* * * * *